US007671103B2

(12) United States Patent
Eilbracht et al.

(10) Patent No.: US 7,671,103 B2
(45) Date of Patent: Mar. 2, 2010

(54) USE OF BLOCK POLYETHERSILOXANES AS STABILIZERS IN POLYURETHANE FOAMS

(75) Inventors: Christian Eilbracht, Herne (DE); Manfred Klincke, Castrop-Rauxel (DE); Isabella Ulrich-Brehm, Ratingen (DE)

(73) Assignee: Goldschmidt AG, Essen (DE)

( * ) Notice: Subject to any disclaimer, the term of this patent is extended or adjusted under 35 U.S.C. 154(b) by 895 days.

(21) Appl. No.: 11/030,940

(22) Filed: Jan. 7, 2005

(65) Prior Publication Data

US 2005/0176837 A1 Aug. 11, 2005

(30) Foreign Application Priority Data

Jan. 9, 2004 (DE) ....................... 10 2004 001 408

(51) Int. Cl.
*C08G 77/46* (2006.01)

(52) U.S. Cl. ....................... 521/112; 521/110; 521/114; 521/117; 521/170; 521/174

(58) Field of Classification Search ................. 521/112, 521/114, 117, 170, 174, 110
See application file for complete search history.

(56) References Cited

U.S. PATENT DOCUMENTS 4,304,875 A * 12/1981 Duvernay et al. ........... 521/112
4,687,786 A * 8/1987 Kollmeier et al. ........... 521/110
4,692,476 A * 9/1987 Simpson ..................... 521/112
4,814,409 A * 3/1989 Blevins et al. ................ 528/25
4,855,329 A * 8/1989 Blevins et al. .............. 521/112
5,306,737 A * 4/1994 Burkhart et al. ............. 521/112
5,475,076 A 12/1995 Braun et al.
5,985,948 A * 11/1999 Burkhart et al. ............. 521/112

FOREIGN PATENT DOCUMENTS

DE 31 26 343 A1 1/1983
EP 0 786 488 A2 7/1997
EP 0 867 464 A1 9/1998

* cited by examiner

*Primary Examiner*—John Cooney
(74) *Attorney, Agent, or Firm*—Frommer Lawrence & Haug LLP

(57) ABSTRACT

The invention relates to the use of compounds of the general formula (VII)

$$Z-\left[\left[\left(O-\overset{R^3}{\underset{R^4}{Si}}\right)_n\left(O-\overset{R^5}{\underset{R^6}{Si}}\right)_o\right]\left[\left(O-\overset{R^1}{\underset{R^2}{Si}}\right)_m\right]\right]_p-O-Z \qquad \text{(VII)}$$

as stabilizers in the preparation of polyurethane foams.

16 Claims, No Drawings

USE OF BLOCK POLYETHERSILOXANES AS STABILIZERS IN POLYURETHANE FOAMS

BRIEF SUMMARY OF THE INVENTION

The invention relates to the use of block polyethersiloxanes as stabilizers in the preparation of polyurethane foams.

BACKGROUND OF THE INVENTION

Owing to their unique properties, such as water repellency, surface activity, thermal stability, etc., siloxanes are used in numerous industrial applications. These include the stabilization of polyurethane foams. For the industrial production of polyurethane foams, polyoxyalkylene-polysiloxane block copolymers are usually used as stabilizers. They emulsify the raw materials used, stabilize the foam during the preparation process and permit the formation of a uniform pore structure having the desired cell fineness and open-cell character. By means of suitable silicone surfactants tailored to the respective raw materials and production processes, it is thus possible to optimize foam properties and preparation processes.

The usability of these polyoxyalkylene-polysiloxane block copolymers in polyurethane foam applications is determined by the equilibrium to be established for the polysiloxane blocks and the polyoxyalkylene blocks. Thus, the composition as well as the distribution of these two blocks are of key importance. The possibilities of varying the polyoxyalkylene blocks are described, inter alia, in EP-A-0 867 464. The polyoxyalkylene blocks may be linked to the polysiloxane via an SiC bond which is stable to hydrolysis or an Si—OC bond which has limited stability to hydrolysis. The polysiloxane may be modified with regard to the number of siloxane units, the branches and the number of possible linkages with the polyoxyalkylene.

A standard method for the preparation of SiC-linked polyoxyalkylene-polysiloxane block copolymers is hydrosilylation. Here, an SiH-containing siloxane is reacted with organic groups which contain a terminal double bond. If the SiH-containing siloxanes are prepared by standard processes (equilibration), the SiH functionalities are randomly distributed along the siloxane chain. In the case of a predetermined functionalization density which ensures the required compatibility of the siloxane with the polyurethane raw materials, the average length of the unmodified regions in the siloxane chains is determined as a quotient of the total chain length and number of SiH functionalities, i.e. the achievable length of unmodified siloxane is limited by the predetermined functionalization density. If the desired functionalization density is high, only short regions of unmodified siloxane can be obtained in the chains, resulting in a deterioration of the actual properties of the siloxane. If a low functionalization density is established, the proportion of unmodified or extremely weakly modified siloxanes increases owing to the random distribution, particularly in the case of short chain lengths. In the preparation of polyurethane foams, these unmodified siloxanes have an undesired antifoam and destabilizing effect because of a lack of sufficient compatibility with the raw materials.

One possibility for optimizing the polyoxyalkylene-polysiloxane block copolymers as a polyurethane foam stabilizer consists in the partial elimination of the random distribution of the functionalization by siloxanes having a block structure which permits decoupling of functionalization density and maximum length of the unmodified regions and avoids fractions of undesired unfunctionalized siloxanes. With the aid of this technique, it is possible in principle to combine the strong surface activity of "pure" siloxane and the organic modification without disadvantages by being able to realize with the formulation compatible siloxanes with simultaneous presence of long unmodified siloxane chains. In this way, stabilizers which greatly reduce the surface tension and have sufficient polymer compatibility can be formulated.

There have been in the past some efforts to synthesize siloxanes which have a block structure and are composed of blocks of unmodified siloxane and blocks of organomodified siloxane.

Thus, U.S. Pat. No. 5,475,076 describes compounds which contain blocks of unmodified and modified siloxane. However, these compounds always contain at least one crosslinkable group (T unit) via which a network is built up between the individual siloxane chains. As a result of this crosslinking, siloxane chains are no longer present; rather, a sort of thermosetting plastic forms.

In contrast, DE-A-31 26 343 describes a process in which $\alpha,\omega$-hydroxy-functional siloxanes which are composed of monoorganohydrogensiloxane units and optionally diorganosiloxane units are reacted with $\alpha,\omega$-hydroxy-functional siloxanes which are composed exclusively of diorganosiloxane units. However, the reaction is effected under acidic conditions so that not only is the condensation of the hydroxyl groups catalyzed but at the same time an equilibration also takes place, resulting in a redistribution of the SiH functionalities along the chain. Thus, a block structure is not realized; rather, there is only a lengthening of the chain of the siloxane with the SiH functionalities.

In contrast, EP-A-0 786 488 describes a process for the preparation of siloxanes which consist of blocks which carry SiH functionalities and blocks which are free of functional groups. However, in these siloxanes, the SiH-containing blocks consist exclusively of siloxane groups in which an alkyl group and a hydrogen atom are bonded to each silicon atom.

The functionalization density of these blocks is accordingly extremely high. In the hydrosilylation, such high functionalization densities often tend to be disadvantageous, since it is extremely difficult to achieve a quantitative reaction of the SiH functionalities without secondary reactions.

As a result, SiH frequently remains in the end product, especially if a hydrosilylation with bulky olefins is carried out. Residues of SiH functionalities can undergo uncontrolled reactions during storage (for example elimination of hydrogen), which may lead to considerable problems.

As a source of the SiH groups, EP-0 786 488 uses $D_4H$ (1,2,3,4-tetramethylcyclotetrasiloxane), which, owing to its extremely high reactivity (spontaneous ignition), is a chemical which is difficult to handle on industrial scales.

In addition, the described process for the preparation of the siloxanes having a block structure does not offer the possibility of establishing the functionalization density of the SiH-containing block in a targeted and defined manner.

DETAILED DESCRIPTION OF THE INVENTION

A process for synthesizing a siloxane having a block structure and composed of unmodified siloxane blocks and modified siloxane blocks from raw materials which are easy to handle, where the functionalization density of the SiH-containing block can be established in a targeted manner, consists in carrying out equilibration and condensation separately from one another.

This gives a block copolymer whose one block (A) is composed of siloxane units without a hydrogen substituent, according to formula (I):

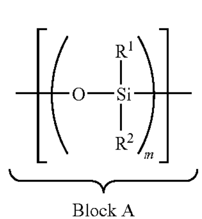
Block A (I)

in which $R^1$ and $R^2$ are identical or different radicals selected from linear or branched, saturated, monounsaturated or polyunsaturated alkyl, aryl, alkylaryl or arylalkyl radicals having 1 to 20, in particular 1 to 10, carbon atoms, haloalkyl groups having 1 to 20 carbon atoms, siloxy groups and triorganosiloxy groups, in particular where each of the organo moieties independently having 1 to 8 carbon atoms or is phenyl, more particularly where each of the organo moieties are methyl; and m is an integer from 5 to 300, preferably from 5 to 100, and whose second block (B) is composed of siloxane units which consist both of monohydrogen-functional siloxane units and of siloxane units without hydrogen as a substituent, according to formula (II):

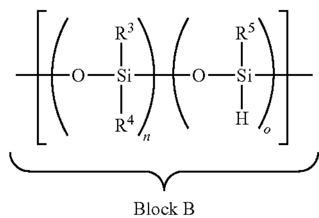
Block B (II)

in which $R^3$, $R^4$ and $R^5$ are identical or different radicals selected from linear or branched, saturated, monounsaturated or polyunsaturated alkyl, aryl, alkylaryl or alkylaryl radicals having 1 to 20, in particular 1 to 10, carbon atoms, haloalkyl groups having 1 to 20 carbon atoms, siloxy groups and triorganosiloxy groups, in particular where each of the organo moieties independently having 1 to 8 carbon atoms or is phenyl, more particularly where each of the organo moieties are methyl;

n is an integer between 5 and 300, preferably between 5 and 50;

o is an integer between 2 and 300, preferably between 2 and 50, the sum (n+o) being <400, preferably <100.

The average chain length (D) of the dialkylsiloxane (I) $m_D$ is between 5 and 300, preferably between 5 and 100; and the average chain length of the siloxane (II) $(n+o)_D$ is, independently of $m_D$, from 7 to 400, preferably from 7 to 100.

The process for the preparation of block copolymers comprises reacting a prepolymer of the formula (III)

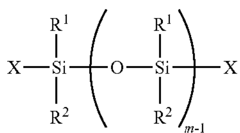

(III)

in which $R^1$ and $R^2$ are identical or different radicals selected from linear or branched, saturated, monounsaturated or polyunsaturated alkyl, aryl, alkylaryl or arylalkyl radicals having 1 to 20, in particular 1 to 10, carbon atoms, haloalkyl groups having 1 to 20 carbon atoms, siloxy groups and triorganosiloxy groups, in particular where each of the organo moieties independently having 1 to 8 carbon atoms or is phenyl, more particularly where each of the organo moieties are methyl;

X is a halogen, a hydroxyl group, an alkoxy group, an organic acid group or a sulfo group;

m is an integer between 5 and 300, preferably between 5 and 100, which represents the average number of siloxane units in the chain, with a prepolymer blend having the composition of the formulae (IVa to IVc)

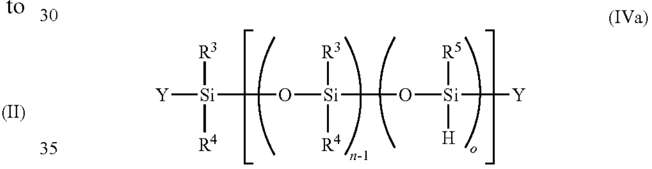

(IVa)

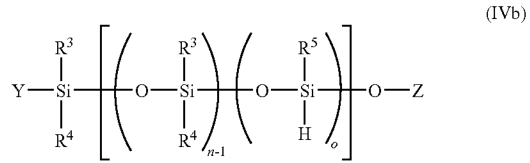

(IVb)

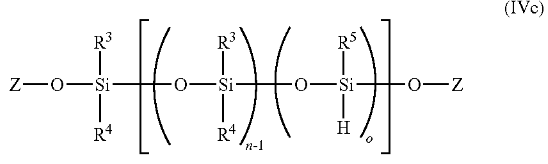

(IVc)

in which $R^3$, $R^4$ and $R^5$ are identical or different radicals selected from linear or branched, saturated monounsaturated or polyunsaturated alkyl, aryl, alkylaryl or arylalkyl radicals having 1 to 20, in particular 1 to 10, carbon atoms, haloalkyl groups having 1 to 20 carbon atoms, siloxy groups and triorganosiloxy groups, in particular where each of the organo moieties independently having 1 to 8 carbon atoms or is phenyl, more particularly where each of the organo moieties are methyl;

n is an integer between 5 and 300, preferably between 5 and 50;

o is an integer between 2 and 300, preferably between 2 and 50;

the sum (n+o) being $\leqq 400$, preferably $\leqq 100$;

Y is a halogen, a hydroxyl group, an alkoxy group, an organic acid group or a sulfo group;

Z is a triorganosilyl radical, in particular where each of the organo moieties independently having 1 to 8 carbon atoms or is phenyl, more particularly where each of the organo moieties are methyl, the proportions in the mixture of (IVb) and (IVc) which contain unreactive terminal groups being determined by the preparation process by equilibration and being capable of being varied, in a customary condensation reaction to give the block copolymer of the general formula (V)

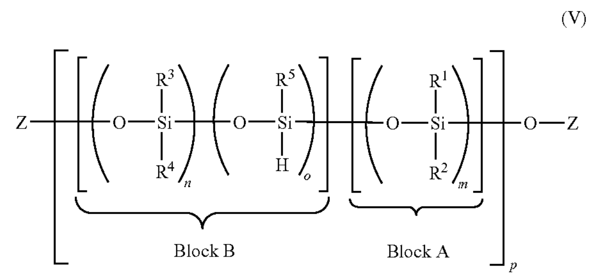

in which $R^1$, $R^2$, $R^3$, $R^4$, $R^5$, Z, m, n and o have the above meaning and p is between 2 and 50, preferably between 2 and 20.

The condensation reaction is carried out in such a way that the reactivities of the terminal groups X and Y are tailored to one another and are suitable for condensation.

Usually, siloxane copolymers according to the prior art are represented by the formula (VI):

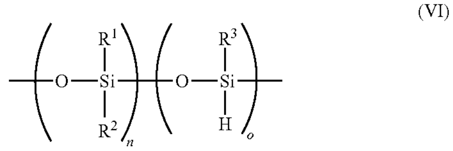

in which $R^1$, $R^2$ and $R^3$ have the meaning described above and n and o are integral variables. However, these formulae provide no information about the distribution of the individual components along the chain, and the indices n and o merely indicate the ratio of the individual components of the polymer. The distribution of the individual components along the chain is usually random as a result of the production process (equilibration).

In contrast, the siloxanes concomitantly used according to the invention have a block structure, as described by the general formula (V).

Accordingly, the blocks B contain both siloxane units which carry no hydrogen (index n) and siloxane units which have a hydrogen substituent (index o). Together, these form the block B in which the individual building blocks are randomly distributed. The block A consists exclusively of siloxane units which contain no hydrogen substituents (index m). The entire polysiloxane is composed of a repetition of the blocks A and B (index p).

The siloxanes prepared by the process described above are composed of blocks B according to formula (V), which in turn have the composition according to formula (II), in which n and o have the meaning described above, and blocks A according to formula (V), which in turn have a composition according to formula (I), in which m has the meaning described above. The index p may be between 2 and 50, preferably between 2 and 20.

The substituents of the siloxane having a block structure, $R^1$, $R^2$, $R^3$, $R^4$ and $R^5$ in formula (V), may be identical or different and have the meaning described above. Methyl and phenyl groups are preferred.

The prepolymer (III) can be prepared by standard processes, such as the hydrolysis of dichlorodiorgano- or dialkoxydiorganosiloxanes, or by the equilibration of corresponding cyclic oligomers, resulting in a polysiloxane which consists exclusively of diorganosiloxane units.

On the other hand, the prepolymer blend (IVa to IVc) is synthesized by the equilibration of an α,ω-functional siloxane, which consists exclusively of diorganosiloxane units in the chain, with a siloxane which consists exclusively of monoorganohydrogensiloxane units in the chain. The terminal groups of the siloxane which consists exclusively of monoorganohydrogensiloxane units are such that they cannot undergo a condensation reaction (e.g. trimethylsilyl). Since they are incorporated into the siloxane during the equilibration of the α,ω-functional siloxane, a certain proportion of this polymer blend (IVb, IVc) has unreactive terminal groups.

In the condensation reaction of the prepolymer (III) with the prepolymer blend (IVa to IVc), the chain length (index p) of the siloxane (V) having a block structure is limited by the unreactive terminal groups of the prepolymer blend (IVa to IVc). In addition, the number of unreactive terminal groups can be increased by adding a suitable siloxane, such as, for example, hexamethylsiloxane, during the equilibration of the prepolymer blend (IVa to IVc).

By increasing the number of unreactive terminal groups, the total chain length of the siloxane according to the invention which has a block structure can be controlled in a targeted manner. Compared with the processes described in EP-A-0 786 488 and intended for establishing the total chain length (addition of terminal groups in, the condensation, e.g. trimethylchlorosilane or trimethylsilanol), this procedure has the advantage that the end product is free of pure silicone oil, which presents considerable difficulties in numerous applications and is therefore often undesired. In another embodiment of the invention, the end product has less than about 50 ppm of pure silicone oil. In yet another embodiment of the invention, the end product has less than about 100 ppm of pure silicone oil.

The invention relates to the use of compounds of the general formula (VII)

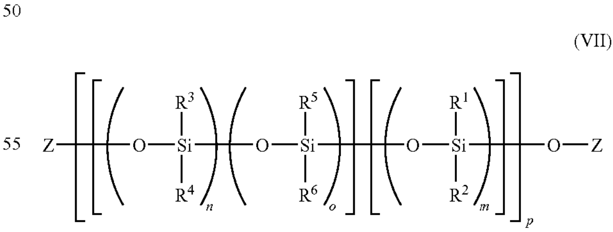

in which $R^1$, $R^2$, $R^3$, $R^4$ and $R^5$ are identical or different radicals selected from linear or branched, saturated, monounsaturated or polyunsaturated alkyl, aryl, alkylaryl or arylalkyl radicals having 1 to 20, in particular 1 to 10, carbon atoms, haloalkyl groups having 1 to 20 carbon atoms, siloxy groups and triorganosiloxy groups, in particular where each of the organo moieties independently having 1 to 8 carbon atoms or is phenyl, more particularly where each of the organo moieties are methyl;

$R^6$ is at least one radical selected from the group consisting of $CH_2—CH_2—(CH_2)_a—A$ or $CH═CH—(CH_2)_a—A$, where a is an integer between 0 and 10; and A is a radical which is selected from polyoxyalkylene radicals or linear, branched or cyclic, saturated, monounsaturated or polyunsaturated alkyl, aryl, alkylaryl or arylalkyl radicals having 1 to 100, in particular 1 to 50, carbon atoms, which optionally contain hetero atoms;

Z is a triorganosilyl radical, in particular where each of the organo moieties independently having 1 to 8 carbon atoms or is phenyl, more particularly where each of the organo moieties are methyl;

m is an integer between 5 and 300;

n is an integer between 5 and 300;

o is an integer between 2 and 300;

the sum (n+o) being ≦400;

p is an integer between 2 and 50, as stabilizers in the preparation of polyurethane foams.

These are obtained by reacting the siloxanes having a block structure with unsaturated compounds (hydrosilylation).

Here, unsaturated polyethers preferably serve as reactants for the hydrosilylation, so that $R^6$ from formula (VII) preferably corresponds to the general formula (VIII)

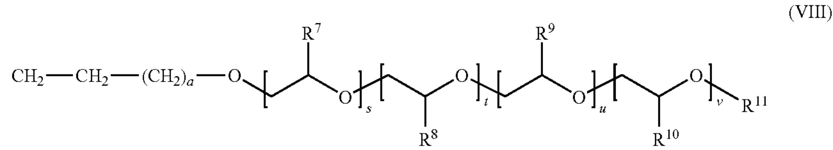

in which a is an integer between 0 and 10;

$R^7$, $R^8$, $R^9$ and $R^{10}$ are identical or different radicals selected from hydrogen or linear or branched, saturated, monounsaturated or polyunsaturated alkyl, aryl, alkylaryl or arylalkyl radicals having 1 to 20, in particular 1 to 10, carbon atoms and haloalkyl groups having 1 to 20 carbon atoms, hydrogen and methyl, butyl and phenyl radicals being preferred;

s, t, u and v, independently of one another, are integers from 0 to 100, preferably from 0 to 50, the sum (s+t+u+v) being ≧2;

$R^{11}$ is hydrogen or an alkyl radical selected from linear or branched alkyl, aryl, alkylaryl or arylalkyl radicals having 1 to 20, in particular 1 to 10, carbon atoms, haloalkyl groups having 1 to 20 carbon atoms or an acyl radical having 1 to 20, in particular 1 to 10, carbon atoms; hydrogen and methyl and acetyl radicals being preferred.

The use of these polysiloxane-polyoxyalkylene block copolymers permits the preparation of rigid polyurethane foams having an optimized property profile. As is familiar to a person skilled in the art, as a rule siloxane chain lengths of <50 $SiR_2O$ units prove to be advantageous in the preparation of rigid foams, in contrast to flexible foam applications. Surprisingly, rigid foams which were prepared using block copolymers described in the present invention and having siloxane chain lengths substantially >50 $SiR_2O$ units exhibit no significant deteriorations in properties. Rather, the block copolymers used as additives are distinguished by a high stabilization potential and can increase the cell fineness of the foams and improve insulation properties.

EXAMPLES

Description of the Chemicals Used

PTF1: Monomethylhydrogenpolysiloxane, MW~2500 g/mol,

α,ω-Cl-siloxane: α,ω-Dichlorodimethylpolysiloxane, MW~600 g/mol,

D4/D5: Mixture of octamethylcyclotetra-siloxane/decamethylcyclopentasiloxane

HMDS: Hexamethyldisiloxane

PDM-siloxane (I): α,ω-Dihydroxydimethylpolysiloxane, MW~3000 g/mol

PDM-siloxane (II): α,ω-Dihydroxydimethylpolysiloxane, MW~540 g/mol.

Examples 1 to 5

Procedure for the Preparation of SiH-Siloxanes Having a Block Structure, Variant A In a three-necked flask having a KPG stirrer and reflux condenser, 0.1% by weight of trifluoromethanesulfonic acid was added to α,ω-Cl-siloxane, PTF1, possibly D4/D5 and HMDS while stirring at room temperature. The mixture was stirred for 8 h. Thereafter, the trifluoromethanesulfonic acid was neutralized in 1.5 eq. of ethyldiisopropylamine and the mixture was stirred for 2 h.

After addition of PDM-siloxane, the stirring was effected in vacuo for 5 h so that the HCl formed was removed from the reaction mixture. The amount of ethyldiisopropylamine required for neutralizing the remaining content of HCl was then added. After stirring for 2 h, 10% by mass of isopropanol were added to the mixture. After the isopropanol had been removed in vacuo and the precipitated salt had been filtered off, the siloxane having a block structure was obtained as a colorless oil.

The examples shown in table 1 were carried out on the basis of this procedure. The viscosity was determined with the aid of a rotational viscometer (Brookfield LVT), and the weight average molecular weight was determined by means of gel permeation chromatography.

TABLE 1

| Example | Weight of PTF1 taken [g] | Weight of Cl-siloxane taken [g] | Weight of D4/D5 taken [g] | Weight of HMDS taken [g] | Weight of PDM-siloxane (I) taken [g] | Weight of PDM-siloxane (II) taken [g] | Viscosity [mPas] | Mw [g/mol] |
|---|---|---|---|---|---|---|---|---|
| 1 | 47.7 | 131.7 | — | — | 747.7 | — | 4600 | 62 600 |
| 2 | 47.7 | 92.2 | — | 11.4 | 428.1 | — | 240 | 19 100 |
| 3 | 323.0 | 492.1 | 681.5 | — | — | 472.1 | 300 | 24 000 |
| 4 | 438.9 | 685.3 | 421.3 | — | 3822.0 | — | 5600 | 76 200 |
| 5 | 414.6 | 483.8 | 1020.3 | — | 879.2 | — | 520 | 29 700 |

The siloxane from example 3 (table 1), according to the invention and having a block structure, was then reacted in a hydrosilylation, without a solvent, with an unsaturated polyether under Pt catalysis.

Example 6

Procedure of the Hydrosilylation of an SiH-Siloxane Having a Block Structure In a three-necked flask having a KPG stirrer, 80 g of the siloxane from example 3 (table 1) having a block structure were mixed with 244.7 g of a polyether initiated with allyl alcohol and having a molecular weight of 800 g/mol and a composition of 26% by mass of propylene oxide and 74% by mass of ethylene oxide and 5 mg of cis-platinum. The reaction mixture was heated to 120° C. for 2 hours while stirring. After cooling, a highly viscous, clear liquid was obtained as a product.

Testing of Performance Characteristics:

For the following comparison, rigid foams were produced in a 145 cm×14 cm×3.5 cm closable metallic mold thermostated at 45° C. by manual foaming of a polyurethane formulation comprising the following components:

| | |
|---|---|
| 100.00 pphp | of sorbitol/glycerol-based polyetherpolyol (460 mg KOH/g) |
| 2.60 pphp | of water |
| 1.50 pphp | of dimethylcyclohexylamine |
| 1.70 pphp | of polysiloxane-polyoxyalkylene copolymers |
| 15.00 pphp | of cyclopentane |
| 198.50 pphp | of diphenylmethane diisocyanate, isomers and homologs (isocyanate content: 31.5%) |

The rigid foams obtained were investigated by a visual assessment with regard to the surface character, the internal defects and cell fineness. Furthermore, the mean thermal conductivity (K factor) was determined by thermal conductivity measurements on 4 samples of each foam body with the aid of a heat flow measurement in a temperature gradient (36° C./10° C.).

The results which have been obtained with the polysiloxane-polyoxyalkylene block copolymer according to the invention (example 6) are compared below with those of a silicone-polyether copolymer used commercially in rigid foam applications and having a random distribution of the polyether modifications along the siloxane chain (TEGOSTAB® B 8404).

| Additive | Siloxane chain length | Surface defects | Internal defects | Cell fineness | Thermal conductivity [mW/mK] |
|---|---|---|---|---|---|
| TEGOSTAB ® B 8404 | <40 | pronounced | pronounced | fine | 23.8 |
| Example 6 | >100 | moderate | pronounced | very fine | 23.5 |

With the polysiloxane-polyoxyalkylene block copolymer from example 6, it was possible to obtain rigid foams which, compared with commercial products, are distinguished by fewer defects, a fine cell structure and improved thermal conductivities.

The above description of the invention is intended to be illustrative and not limiting. Various changes or modifications in the embodiments described herein may occur to those skilled in the art. These changes can be made without departing from the scope or specification of the invention.

The invention claimed is:

1. A stabilized polyurethane foam comprising at least one block copolymer compound of formula (VII) as a stabilizer:

(VII)

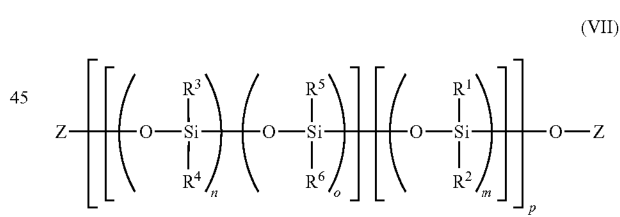

in which $R^1$, $R^2$, $R^3$, $R^4$ and $R^5$ are identical or different radicals selected from the group consisting of linear or branched, saturated, monounsaturated or polyunsaturated alkyl, aryl, alkylaryl or arylalkyl radicals having 1 to 20 carbon atoms, haloalkyl groups having 1 to 20 carbon atoms, siloxy groups and triorganosiloxy groups;

$R^6$ is at least one radical selected from the group consisting of $CH_2—CH_2—(CH_2)_a—A$ or $CH{=}CH—(CH_2)_a—A$, where a is an integer from 1 to 9; and A is a radical which is selected from the group consisting of polyoxyalkylene radicals and linear, branched or cyclic, saturated, monounsaturated or polyunsaturated alkyl, aryl, alkylaryl or arylalkyl radicals having 1 to 100, which optionally contain hetero atoms;

Z is a triorganosilyl radical;

m is an integer between 5 and 300;

n is an integer between 5 and 300;

o is an integer between 2 and 300;

the sum (n+o) being ≦400;

p is an integer between 2 and 50.

2. The stabilized polyurethane foam of claim 1, wherein $R^6$ corresponds to formula (VIII):

(VIII)

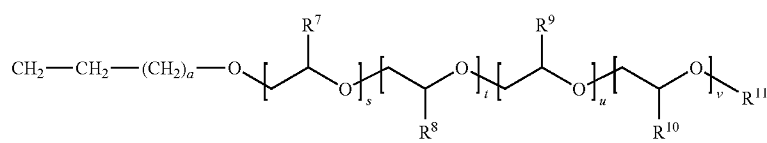

in which a is an integer from 1 to 9;

$R^7$, $R^8$, $R^9$ and $R^{10}$ are identical or different radicals selected from the group consisting of hydrogen, linear or branched, saturated, monounsaturated or polyunsaturated alkyl, aryl, alkylaryl or arylalkyl radicals having 1 to 20, carbon atoms and haloalkyl groups having 1 to 20 carbon atoms;

s, t, u and v, independently of one another, are integers from 0 to 100, the sum (s+t+u+v) being ≧2;

$R^{11}$ is hydrogen or an alkyl radical selected from the group consisting of linear or branched alkyl, aryl, alkylaryl or arylalkyl radicals having 1 to 20, carbon atoms, haloalkyl groups having 1 to 20 carbon atoms and an acyl radical having 1 to 20 carbon atoms.

3. The stabilized polyurethane foam of claim 2 wherein a is an integer from 1 to 3 and wherein $R^7$, $R^8$, $R^9$ and/or $R^{10}$ are hydrogen or methyl, butyl and/or phenyl radicals and $R^{11}$ is a methyl or acetyl radical.

4. The stabilized polyurethane foam of claim 1 wherein $R^1$, $R^2$, $R^3$, $R^4$ and $R^5$ are identical or different radicals selected from the group consisting of linear or branched, saturated, monounsaturated or polyunsaturated alkyl, aryl, alkylaryl or arylalkyl radicals having 1 to 10 carbon atoms, haloalkyl groups having 1 to 20 carbon atoms, siloxy groups and triorganosiloxy groups where each of the organo moieties independently having 1 to 8 carbon atoms or is phenyl;

$R^6$ is at least one radical selected from the group consisting of $CH_2$—$CH_2$—$(CH_2)_a$—A or CH═CH—$(CH_2)_a$—A, where a is an integer from 1 to 9; and A is a radical which is selected from the group consisting of polyoxyalkylene radicals and linear, branched or cyclic, saturated, monounsaturated or polyunsaturated alkyl, aryl, alkylaryl or arylalkyl radicals having 1 to 50 carbon atoms, which optionally contain hetero atoms;

Z is a triorganosilyl radical where each of the organo moieties independently having 1 to 8 carbon atoms or is phenyl;

m is an integer between 5 and 100;

n is an integer between 5 and 50;

o is an integer between 2 and 50;

the sum (n+o) being ≦100;

p is an integer between 2 and 20, as stabilizers in the preparation of polyurethane foams.

5. The stabilized polyurethane foam of claim 2 wherein $R^6$ corresponds to formula (VIII):

(VIII)

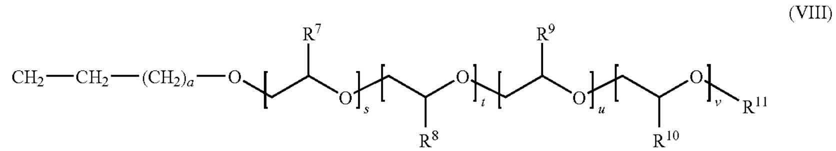

in which a is an integer from 1 to 9;

$R^7$, $R^8$, $R^9$ and $R^{10}$ are identical or different radicals selected from the group consisting of hydrogen, linear or branched, saturated, monounsaturated or polyunsaturated alkyl, aryl, alkylaryl or arylalkyl radicals having 1 to 10 carbon atoms and haloalkyl groups having 1 to 20 carbon atoms;

s, t, u and v, independently of one another, are integers from 0 to 50 the sum (s+t+u+v) being ≧2;

$R^{11}$ is hydrogen or an alkyl radical selected from the group consisting of linear or branched alkyl, aryl, alkylaryl or arylalkyl radicals having 1 to 10 carbon atoms, haloalkyl groups having 1 to 20 carbon atoms and an acyl radical having 1 to 10 carbon atoms.

6. The stabilized polyurethane foam of claim 1 wherein said foam has less than about 100 ppm of pure silicone oil.

7. The stabilized polyurethane foam of claim 6 wherein said foam has less than about 50 ppm of pure silicone oil.

8. The stabilized polyurethane foam of claim 7 wherein said foam is free of pure silicone oil.

9. A method of producing the stabilized polyurethane foam of claim 1 which comprises adding a stabilizing amount of at least one compound of formula (VII):

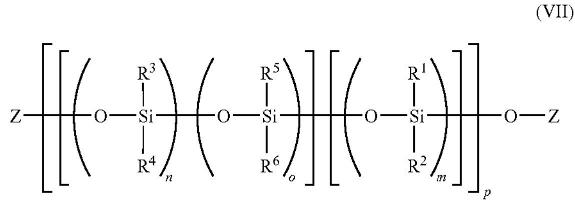

in which $R^1$, $R^2$, $R^3$, $R^4$ and $R^5$ are identical or different radicals selected from the group consisting of linear or branched, saturated, monounsaturated or polyunsaturated alkyl, aryl, alkylaryl or arylalkyl radicals having 1 to 20 carbon atoms, haloalkyl groups having 1 to 20 carbon atoms, siloxy groups and triorganosiloxy groups;

$R^6$ is at least one radical selected from the group consisting of $CH_2—CH_2—(CH_2)_a—A$ or $CH═CH—(CH_2)_a—A$, where a is an integer from 1 to 9; and A is a radical which is selected from the group consisting of polyoxyalkylene radicals and linear, branched or cyclic, saturated, monounsaturated or polyunsaturated alkyl, aryl, alkylaryl or arylalkyl radicals having 1 to 100, which optionally contain hetero atoms;

Z is a triorganosilyl radical;

m is an integer between 5 and 300;

n is an integer between 5 and 300;

o is an integer between 2 and 300;

the sum (n+o) being $\leqq 400$;

p is an integer between 2 and 50 during the preparation of a polyurethane foam.

10. The method of claim 9 wherein $R^6$ corresponds to formula (VIII):

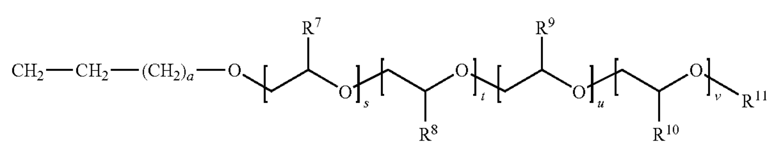

in which a is an integer from 1 to 9;

$R^7$, $R^8$, $R^9$ and $R^{10}$ are identical or different radicals selected from the group consisting of hydrogen, linear or branched, saturated, monounsaturated or polyunsaturated alkyl, aryl, alkylaryl or arylalkyl radicals having 1 to 20, carbon atoms and haloalkyl groups having 1 to 20 carbon atoms;

s, t, u and v, independently of one another, are integers from 0 to 100, the sum (s+t+u+v) being $\geqq 2$;

$R^{11}$ is hydrogen or an alkyl radical selected from the group consisting of linear or branched alkyl, aryl, alkylaryl or arylalkyl radicals having 1 to 20, carbon atoms, haloalkyl groups having 1 to 20 carbon atoms and an acyl radical having 1 to 20 carbon atoms.

11. The method of claim 10 wherein a is an integer from 1 to 3 and wherein $R^7$, $R^8$, $R^9$ and/or $R^{10}$ are hydrogen or methyl, butyl and/or phenyl radicals and $R^{11}$ is a methyl or acetyl radical.

12. The method of claim 9 wherein $R^1$, $R^2$, $R^3$, $R^4$ and $R^5$ are identical or different radicals selected from the group consisting of linear or branched, saturated, monounsaturated or polyunsaturated alkyl, aryl, alkylaryl or arylalkyl radicals having 1 to 10 carbon atoms, haloalkyl groups having 1 to 20 carbon atoms, siloxy groups and triorganosiloxy groups where each of the organo moieties independently having 1 to 8 carbon atoms or is phenyl;

$R^6$ is at least one radical selected from the group consisting of $CH_2—CH_2—(CH_2)_a—A$ or $CH═CH—(CH_2)_a—A$, where a is an integer from 1 to 9; and A is a radical which is selected from the group consisting of polyoxyalkylene radicals and linear, branched or cyclic, saturated, monounsaturated or polyunsaturated alkyl, aryl, alkylaryl or arylalkyl radicals having 1 to 50 carbon atoms, which optionally contain hetero atoms;

Z is a triorganosilyl radical where each of the organo moieties independently having 1 to 8 carbon atoms or is phenyl;

m is an integer between 5 and 100;

n is an integer between 5 and 50;

o is an integer between 2 and 50;

the sum (n+o) being $\leqq 100$;

p is an integer between 2 and 20.

13. The method of claim 12 wherein $R^6$ corresponds to formula (VIII):

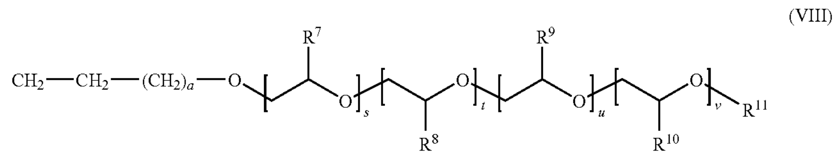

in which a is an integer from 1 to 9;

$R^7$, $R^8$, $R^9$ and $R^{10}$ are identical or different radicals selected from the group consisting of hydrogen, linear or branched, saturated, monounsaturated or polyunsaturated alkyl, aryl, alkylaryl or arylalkyl radicals having 1 to 10 carbon atoms and haloalkyl groups having 1 to 20 carbon atoms;

s, t, u and v, independently of one another, are integers from 0 to 50 the sum (s+t+u+v) being $\geqq 2$;

$R^{11}$ is hydrogen or an alkyl radical selected from the group consisting of linear or branched alkyl, aryl, alkylaryl or arylalkyl radicals having 1 to 10 carbon atoms, haloalkyl groups having 1 to 20 carbon atoms and an acyl radical having 1 to 10 carbon atoms.

14. The method of claim 9 wherein a stabilized polyurethane foam is formed which has less than about 100 ppm of pure silicone oil and does not require a step to remove pure silicone oil.

15. The method of claim 14 wherein a stabilized polyurethane foam is formed which has less than about 50 ppm of pure silicone oil and does not require a step to remove pure silicone oil.

16. The method of claim 15 wherein a stabilized polyurethane foam is formed which is free of pure silicone oil and does not require a step to remove pure silicone oil.

* * * * *